March 31, 1925.                                                              1,531,847
                        C. H. DANFORTH ET AL
                           CANDY CONVEYER
                      Filed Sept. 16, 1920        5 Sheets-Sheet 1

Inventor
Charles H. Danforth
By Forrest W. Dixon

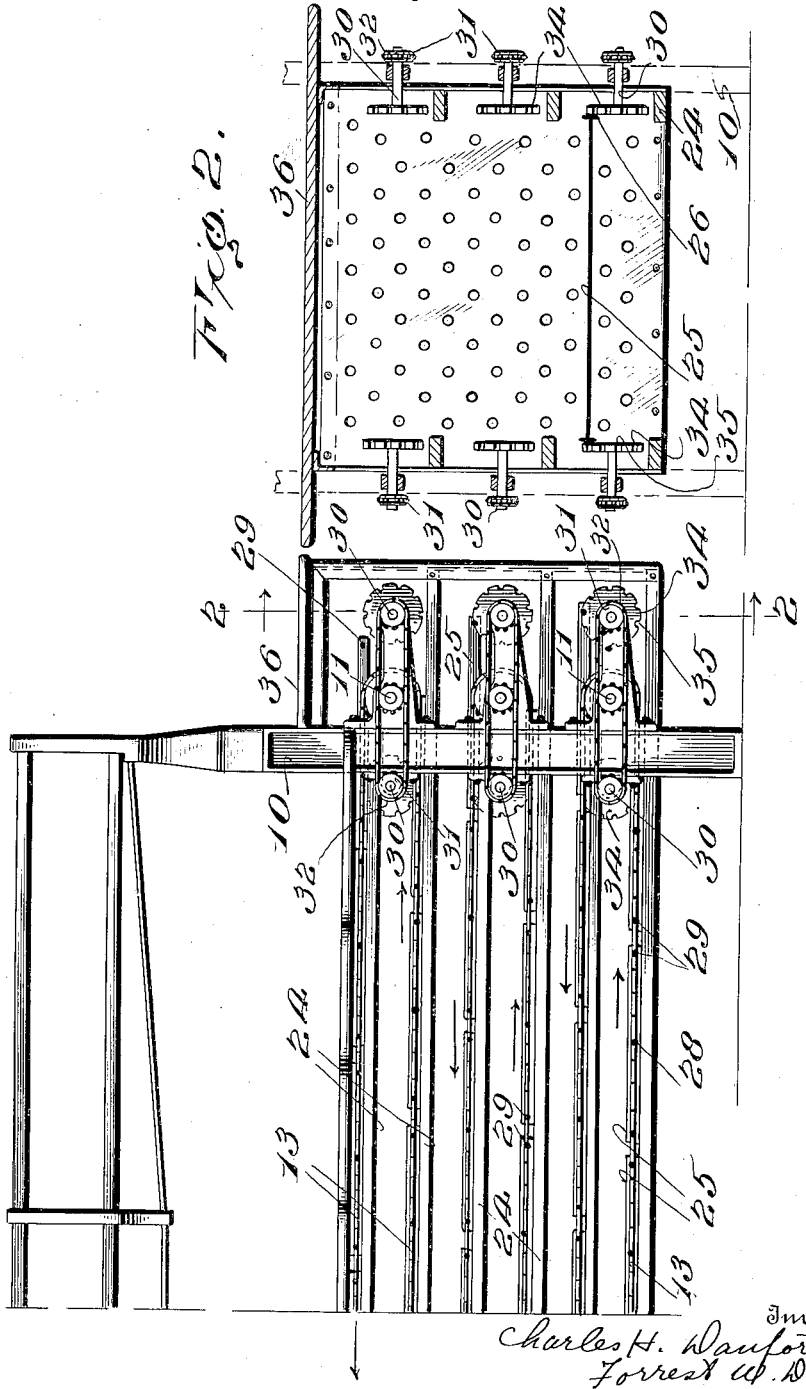

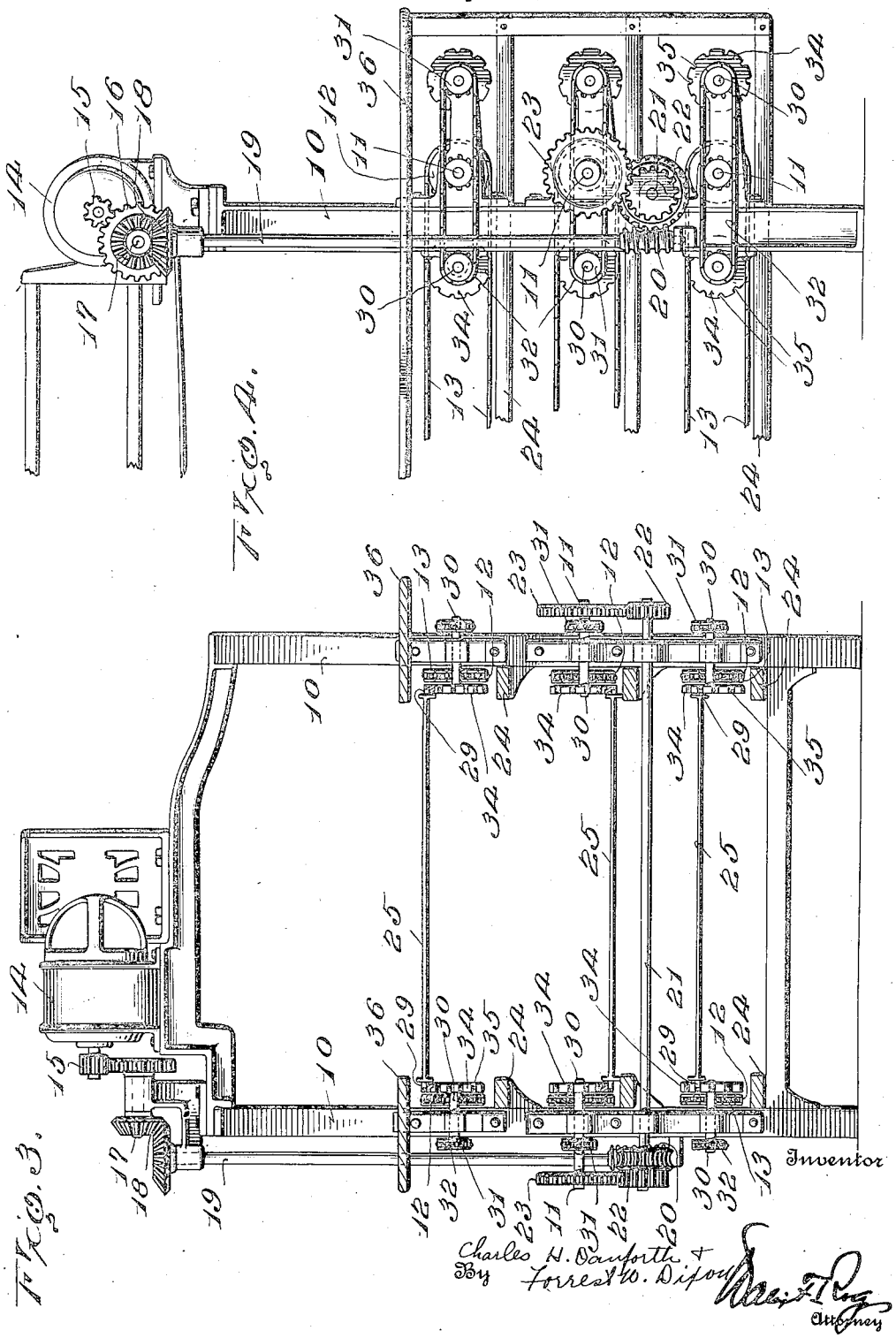

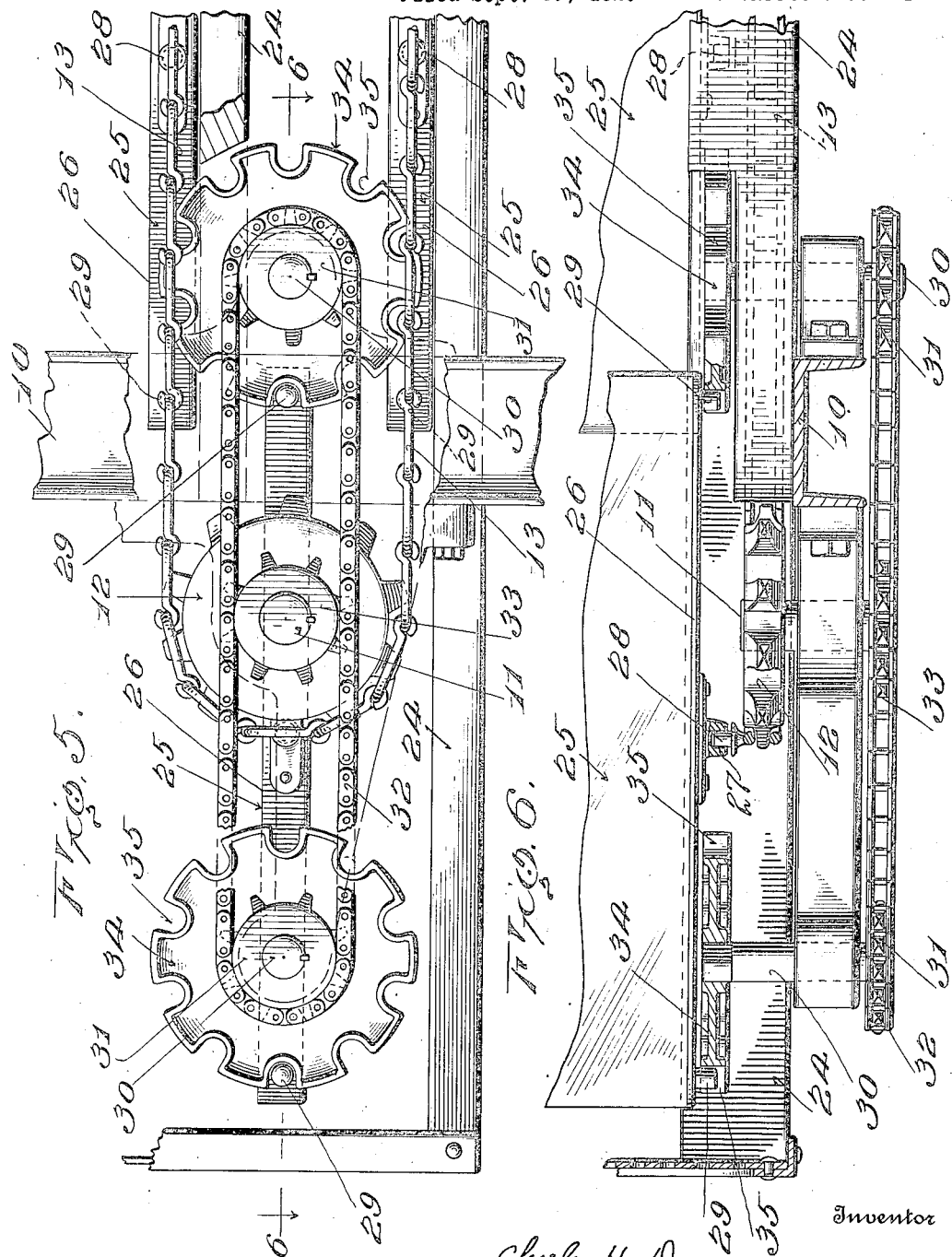

March 31, 1925.
C. H. DANFORTH ET AL
1,531,847
CANDY CONVEYER
Filed Sept. 16, 1920   5 Sheets-Sheet 5
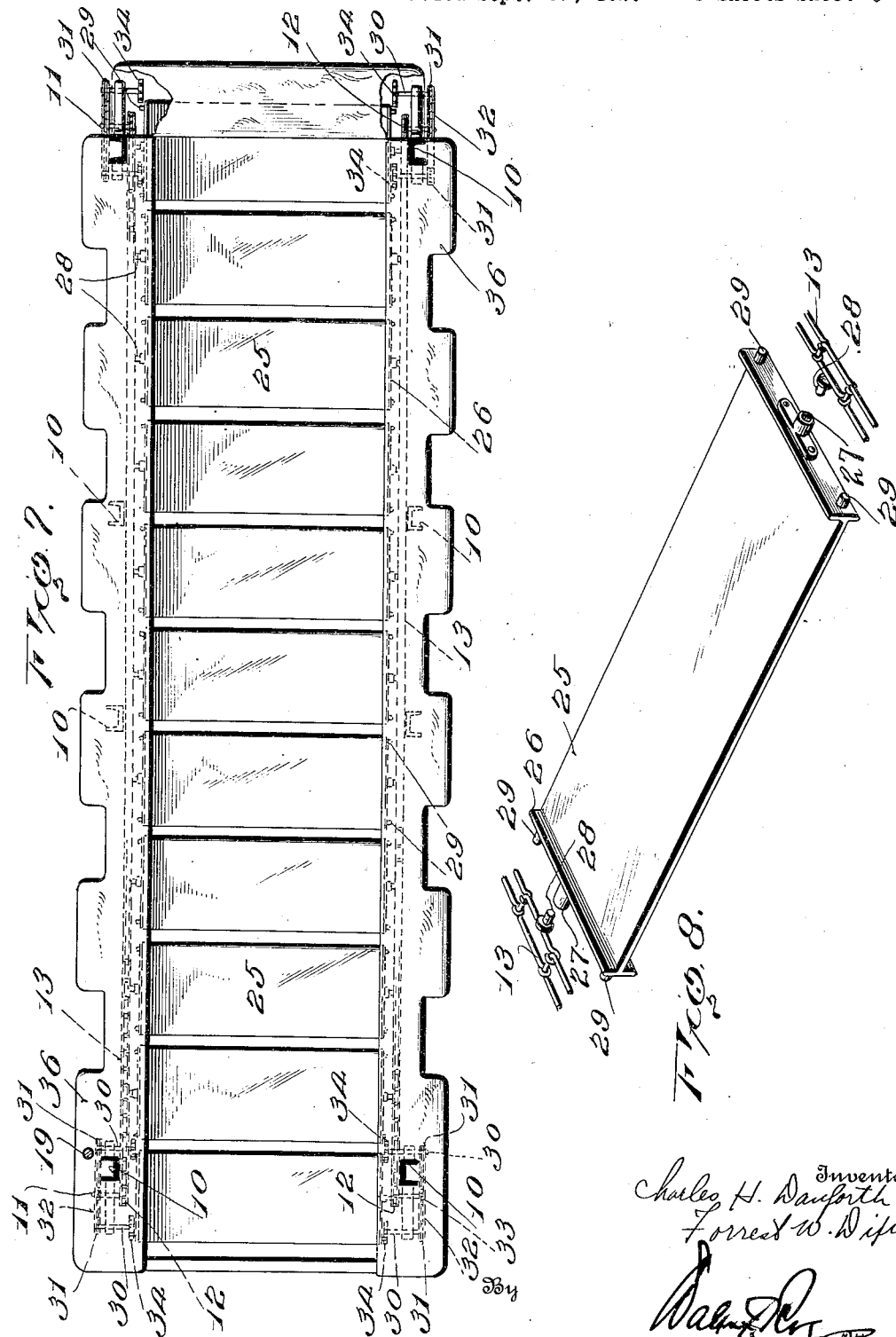

Patented Mar. 31, 1925.

1,531,847

UNITED STATES PATENT OFFICE.

CHARLES H. DANFORTH AND FORREST W. DIXON, OF CAMBRIDGE, MASSACHUSETTS, ASSIGNORS, BY MESNE ASSIGNMENTS, TO SAID FORREST W. DIXON.

CANDY CONVEYER.

Application filed September 16, 1920. Serial No. 410,662.

*To all whom it may concern:*

Be it known that we, CHARLES H. DANFORTH and FORREST W. DIXON, citizens of the United States, residing at Cambridge, in the county of Middlesex and State of Massachusetts, have invented certain new and useful Improvements in Candy Conveyers, and we do hereby declare the following to be a full, clear, and exact description of the invention, such as will enable others skilled in the art to which it appertains to make and use the same.

Our invention relates to conveying apparatus and consists in the combinations and arrangements of elements hereinafter described and particularly set forth in the claims.

The purpose of the invention is to provide an endless conveyer which may be used for drying material, or as a table for packing the material preparatory to shipping; and this especially in the handling of candy or other confections where temperature conditions and uniformity of packing are essential.

A further novel feature of the conveying apparatus resides in having the carrier arranged to travel in a series of super-posed levels or paths to the end of fully utilizing the space taken up by the machine, and to allow for the time necessary to properly dry the candy or other material which is conveyed.

Another purpose of the invention is to produce a machine of this character having elevators and stabilizers located at the several points of turning of the trays or carriers so that the same will be maintained in a steady and horizontal position when changing from one elevation to another, which, in candy making, avoids, the danger of spoiling the so called "string" (an identifying mark) on the candy and also prevents the forming of what is known as "bottoms" while the goods are on the machine.

It is further proposed to construct a conveying apparatus of this character with the conveyer arranged in successive series of different stages or levels to the end that the goods carried will be delivered to the machine and removed therefrom at one and the same level, and at the beginning and ending respectively of each cycle of operation of the conveyer for convenience in working and in order that the speed of the machine will serve as a check upon the quantity of material conveyed and also govern the amount and speed of work which must be performed by the operators.

The invention is disclosed by way of illustration in the accompanying drawing wherein,—

Figure 1 is a side elevational view of one end of the apparatus;

Fig. 1ª a like view of the other end thereof;

Fig. 2 a transverse sectional view taken on the line 2—2 of Figure 1ª.

Fig. 3 a transverse sectional view on the line 3—3 of Figure 1;

Fig. 4 a detail side elevation view showing the power transmission;

Fig. 5 a side elevational view of one of the elevators or stabilizers;

Fig. 6 a horizontal sectional view taken on the line 6—6 of Figure 5;

Fig. 7 a top plan view of the machine; and

Fig. 8 a detail perspective view of one of the trays.

Referring to the construction of the apparatus in further detail and wherein like reference characters designate corresponding parts in the different figures shown, and Figs. 1 to 4 inclusive in particular, 10 designates a suitable supporting frame structure for the machine which in its entirety includes the two portions disclosed in Fig. 1 and Fig. 1ª combined. Suitably journalled in the frame 10 see Figs. 5 and 6, are a plurality, herein ten, of horizontally disposed shafts 11 having mounted thereon the sprockets 12 on which travel the two endless chains 13 of the conveyer.

The endless chains 13, one on each side of the machine, are arranged to provide two opposed series of conveyor sections or stages in super-posed lengths to the end of fully utilizing all of the available space occupied by the machine, and a motor 14 is connected to drive the conveyor through the following transmission, viz, a pinion 15 meshing with a larger pinion 16 on a counter shaft 17; miter gear 18 driving the vertical shaft 19 having a screw and worm gear connection 20 with the horizontal shaft 21; and pinions 22 on shaft 21 meshing with pinions 23 on two of the sprocket shafts 11. It will thus be seen that the several runs or stages of the single conveyer are driven from one and the same power source and with the same speed.

A pair of tracks 24 Fig. 3, are provided for each run of the conveyer and serve to support the conveyor trays 25 that are pivotally connected to the chain 13 intermediate its side edges for the purpose of balance as shown (see Fig. 8). Each tray Fig. 8, has a pair of ends or runners 26 that engage with the track and the runners have socket pieces 27 to receive the studs or pivotal bearing 28 carried by the chains, and lugs 29 located at the four corners of the tray co-operate with the stabilizers, for holding the tray horizontally when changing from one level to another. If only light loads are to be handled, the lugs 29 may be omitted from one end of the tray.

Each stabilizer, Figs. 3, 5, 6, consists of two stub shafts 30 suitably journalled in the frame and having sprockets 31 keyed thereon and connected by an endless chain length 32 (see Fig. 5) and a third sprocket 33 on the shaft 11 engages to drive the chain 32 at a speed commensurate with the travel of the conveyer. A disk 34 is mounted on each of the shafts 30 and is provided on its periphery with a plurality of uniformly spaced notches 35 that are adapted to engage with the studs or lugs 29 of the tray as the tray leaves the level of one conveyer length and ascends or descends to the next following length and then releases the tray. It will be understood, of course, that forked arms or other suitable devices may be used in place of the notched disks 34 inasmuch as it is essential only that each tray be engaged at its four corners (29) and prevented from tilting on its axis (27) when moving from one elevation to another.

The apparatus as disclosed herein shows the single conveyer arranged in two series or sections of super-posed and horizontal lengths located at the respective ends of the machine, to the end that the incoming material (e. g. candy) may be deposited on the moving trays at one end of the machine and caused to traverse the several conveyer lengths and be in proper condition for removal by other workers at the same level at the sides or opposite end of the machine. It will thus be seen that with the speed of the machine and delivery of material determined, the amount of work to be done by the operators may be decided upon, inasmuch as the finished or treated material must necessarily be removed from the trays in order that incoming material may be placed thereon; or stated in another way, the machine is constructed and operates in a manner which avoids accumulation or congestion of work at the receiving end.

The described machine is so improved as to be peculiarly fitted for such work as finishing candy.

In this work, it is essential that the trays should move with absolute precision and particularly when moving from one level to another level.

The arrangement of the transferring mechanism is such that the tray is grasped firmly at points corresponding to the pins 29 equi-distant, from the center of each tray. That is to say, each tray in turn is caught firmly at each of the four corners by the engagement of the pins 29 with the notched disks 34 and is lifted gradually upward or downward by pivot 28 on chain 13 and is at the same time guided in a horizontal plane.

It is not necessary to provide for this adjustment because the recesses of the disk 34 are open and permit any necessary self-adjustment of the tray as it moves up or down or out and in as the case may be.

To this end, as noted, the pivot 28 of each tray is at the center and carries the weight of the tray and also all the load placed thereon. The lugs 29, at each corner, are arranged with reference to the sprockets 12 and the stabilizers 34, so that as each tray ascends or descends, the pins 29 will be in the appropriate pockets of the stabilizers, 34, 34, thus carrying the tray steadily, all four corners being supported and guided as the center of the tray moves along with the endless chain to which it is pivoted.

A shelf 36, see Figs. 2 and 7, of suitable width may be provided for the operatives as extended between the uprights 10 at the ends of the machine.

My invention is not restricted to the particular embodiment thereof shown and described herein.

What is claimed as new is:

1. An apparatus of the character described, comprising, in combination, an endless conveyer, means to guide said conveyer in runs, a series of carriers pivotally connected to said conveyer, each of said carriers having elements at opposite sides of the pivotal connection between the carrier and conveyer, a pair of rotary members adjacent the end of each run having recesses for receiving the carrier elements, and means simultaneously to rotate said members to hold the carriers horizontal during their transfer from one run to another.

2. An apparatus of the character described, comprising, in combination, an endless conveyer, means to guide said conveyer in a series of runs, carriers pivotally connected to said conveyer and each having elements located at opposite sides of the pivotal connection between the carrier and conveyer, means co-operating with said elements to maintain the carriers in horizontal position when traveling between the ends of each run, and devices for holding the carriers horizontal during their transfer from one run to another, each of said devices comprising a pair of members for engaging said elements, and means to rotate said members in unison.

3. An apparatus of the character described, comprising, in combination, an endless conveyer comprising a pair of sprocket chains, and carriers having opposed ends pivotally connected to said sprocket chains, sprocket wheels arranged to guide said sprocket chains in a series of runs, each of said carriers having a pair of elements projecting from one end thereof, tracks engaged by said elements to hold the carriers horizontal during their transit between the ends of the runs, and transfer devices at the ends of the runs, each comprising a pair of rotary members for receiving said elements and holding the carriers horizontal during their movement from one run to another.

4. An apparatus of the character described, comprising, in combination, an endless conveyer having carriers pivotally mounted thereon, means to guide said conveyer in a series of runs, each of said carriers having a pair of elements thereon at opposite sides of the point of pivotal connection of the carrier with the conveyer, and transfer devices at the end of each run, each comprising a pair of rotary members for engagement with said elements, shafts for said members, and means to rotate said shafts in unison.

5. An apparatus of the character described, comprising in combination, an endless conveyer having carriers pivotally mounted at intervals thereon, means to guide said conveyer in upper and lower runs, each of said carriers having a pair of elements thereon located at opposite sides of the point of pivotal connection of the carrier with the conveyer, and transfer devices at the ends of the runs, each comprising a pair of rotary members co-operating with the elements of the carriers as the latter progressively reach the transfer devices for holding the carriers in horizontal position as they move from one run to another.

6. An apparatus of the character described, comprising in combination, an endless conveyer comprising a pair of sprocket chains and carriers pivotally mounted on said chains at intervals, each of said carriers having elements thereon at opposite sides of the points of pivotal connection of the carrier with the sprocket chains, sprocket wheels for said chains, shafts for said sprocket wheels, means operating through the shafts of certain of the sprocket wheels for driving the conveyer, and transfer devices each comprising a pair of rotary members co-operating with the elements of the carriers to hold the latter in horizontal position during movement from one run to another and transmission means for rotating said members from the carrier driving means.

7. An apparatus of the character described, comprising, in combination, a frame, shafts journalled in bearings mounted on said frame, wheels on said shafts, conveyers guided by said wheels in a series of runs, carriers pivotally mounted at intervals on said conveyers and having elements at opposite sides of the points of pivotal connection of the carriers with the conveyers, and transfer devices at the ends of said runs, each comprising a pair of parallel motion members for engaging said elements and holding the carriers horizontal during their transfer from one run to another.

8. An apparatus of the character described, comprising, in combination, an endless conveyer having carriers pivotally mounted thereon at intervals, means for guiding said conveyer in a series of runs, each of said carriers having elements at opposite sides of the point of pivotal connection of the carrier with the conveyer, tracks engaged by said elements to hold the carriers horizontal during their transit between the ends of each run, and transfer devices, each comprising a pair of rotary members co-operating with said elements as they leave said tracks to hold the carriers horizontal during their movement from one track to another track.

In testimony whereof we affix our signatures.

FORREST W. DIXON.
CHARLES H. DANFORTH.